Feb. 15, 1944.  R. L. TUVE  2,341,583
LUMINESCENT OR PHOSPHORESCENT COATING MATERIAL
Filed April 6, 1942
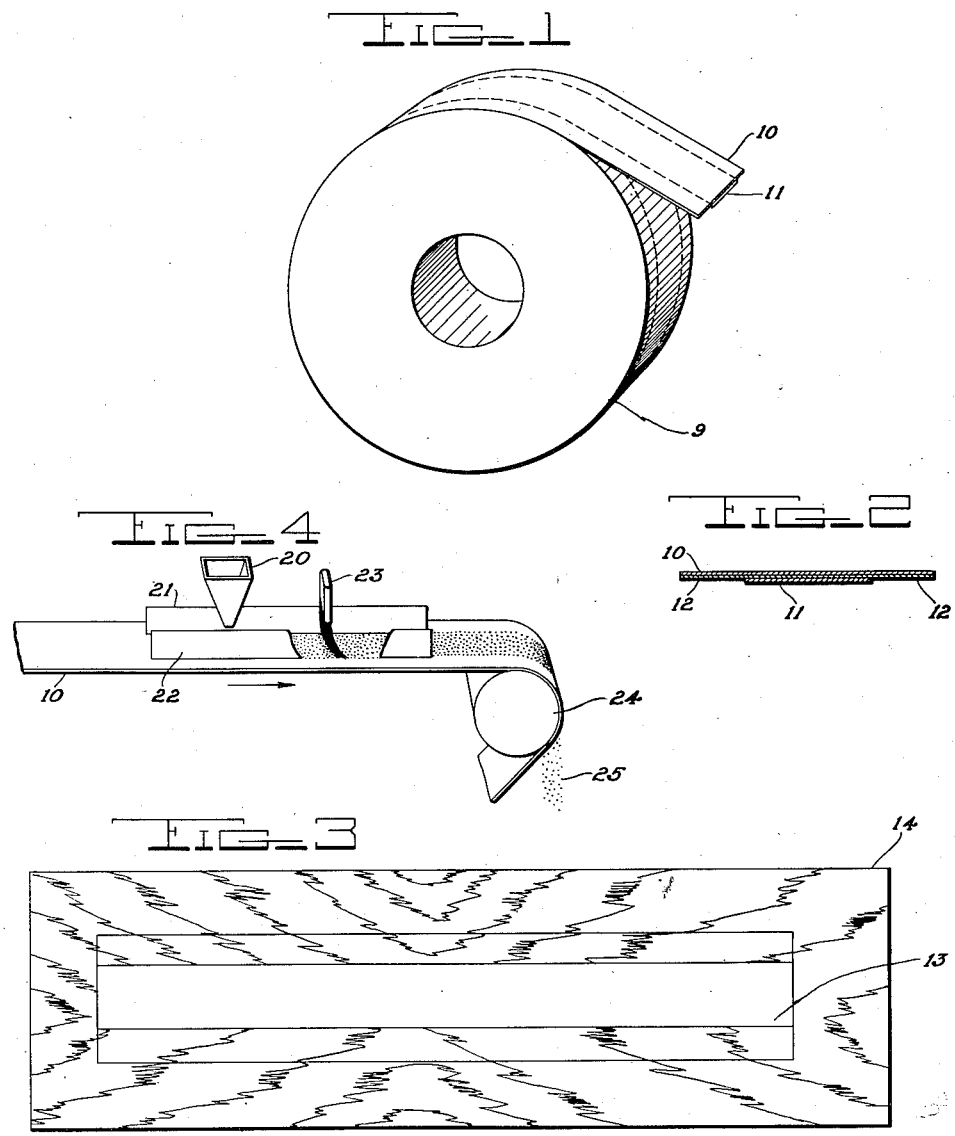
Inventor
Richard L. Tuve Patented Feb. 15, 1944

2,341,583

UNITED STATES PATENT OFFICE 2,341,583

LUMINESCENT OR PHOSPHORESCENT COATING MATERIAL

Richard L. Tuve, Silver Spring, Md.

Application April 6, 1942, Serial No. 437,836

2 Claims. (Cl. 206—59)

(Granted under the act of March 3, 1883, as amended April 30, 1928; 370 O. G. 757)

This invention relates to a material capable of producing a sustained visible glow in darkness, for an appreciable time after having been activated by a source of light, and more particularly to such material in a form which renders it available for use in the formation of luminescent designs or indications of any desired configuration. It further relates to a novel method of manufacturing such material.

In the past, phosphorescent and other luminescent coating materials have been applied to surfaces in the form of a paint or similar coating material. However, the manufacture and use of phosphorescent materials in this form are attended by considerable difficulties. For example, it is impossible to grind the crystals of known phosphorescent pigments to a degree of fineness necessary to maintain a suspension of such material in the normal paint vehicle without destroying the phosphorescent nature of the pigment.

Furthermore, the application of phosphorescent coating materials in such form is attended by the usual difficulties inherent in the application of paints to surfaces and such material once applied is difficult of removal without destroying the pre-existing finish of the surface and thus necessitating complete refinishing.

It is an object of this invention to provide a luminescent material available for the formation of luminescent designs or indications upon surfaces, such material being in a form to obviate the difficulties attending the suspension of phosphorescent or other similar pigments in a liquid vehicle and the subsequent application of such forms of phosphorescent material as a coating material.

It is another object of this invention to provide a luminescent material in a form in which the substance utilized to produce luminescence may, by the action of the material itself, be protected from contact with the atmosphere, both before and during use.

It is another object of this invention to provide a method of manufacturing such material which is simple, economical of apparatus and material and allows the manufactured article to be rolled or used immediately.

It is a further object of this invention to provide such material as a pre-formed sheet of coating material which may easily and quickly be attached to a surface upon which it is desired to form a luminescent indication.

It is a still further object of this invention to provide such material in such form that it may be easily and quickly removed from a surface to which it has been attached without marring the pre-existing finish of the surface, once its presence is no longer desired.

Other objects will become apparent from a careful consideration of the following description taken together with the accompanying drawing in which:

Fig. 1 is an elevational view of a roll of fluorescent tape constituting a preferred form of the invention;

Fig. 2 is an end view of a strip of tape such as shown in Fig. 1;

Fig. 3 is a top plan view of a wooden surface to which has been applied a strip of tape such as shown in Fig. 1, and Fig. 4 is a perspective view of apparatus which may be used in forming a tape of the kind contemplated by the invention.

In the preferred form of the invention the material comprises a transparent plastic tape 10 of the type which is popularly known as "Cellophane" tape and which is normally provided on its underside with a coating of adhesive 12, to the underside of which has been applied a layer 11 of phosphorescent pigment. The layer of phosphorescent material is in the form of a strip applied along the center line of the underside of the tape. This strip is considerably narrower in width than the width of the tape and thus leaves on either side of it an uncoated strip 12 of the adhesive coated under surface of the tape.

The normal adhesive coating of the tape serves to retain the layer of phosphorescent crystals which may be ground to a size most desirable for the maximum luminescent effect. Before use the tape may be assembled in rolls as indicated at 9 in Fig. 1 in which form ordinary adhesive tape is now commonly merchandised. In this form the edges 12 protect the layer 11 from the effect of the atmosphere and also protect it against any mechanical action tending to destroy it.

Fig. 3 shows a strip 13 of the tape in place upon a wooden surface 14. Here again the adhesive portions 12 of the tape protect the luminescent material from the action of the elements except at its ends. These may be protected by covering with a strip of ordinary transparent tape. Luminescent material in the form shown readily lends itself to production of designs such as arrows, numerals, letters, etc., and such indications, after having been actuated by a source of light, will continue to glow in darkness for a period of several hours. Should it be desired to remove the indication it is merely necessary to strip the tape from the surface which can be done without injury to any pre-existing finish the surface may have had.

While the preferred embodiment of the invention consists of tape formed as shown the invention is not to be considered as restricted thereto, since obviously any desired dimensions might be given to the transparent covering material and the luminescent material might be applied to the underside thereof in any pre-formed design which may be found desirable. For example, the transparent material could be in the form of sheets on the underside of which had been formed by luminescent material a desired picture or artistic design.

While the disclosure has been restricted to a transparent tape of the "Cellophane" variety, it should be understood that any transparent material capable of forming a coating for a surface and of retaining an adhesive layer to its under-surface may be utilized for purposes of this invention. Examples of phosphorescent pigments which may be employed are phosphorescent zinc sulphide, calcium sulphide and strontium sulphide.

The disclosure with respect to materials for producing luminosity has thus far been restricted to phosphorescent materials. However, it is obvious that the invention may be carried out by the employment of fluorescent materials, if a source of "black" light or other known visible illumination be provided for their activation.

Manufacture of luminous materials embodying the invention may be very simply accomplished by sprinkling or dusting the phosphorescent of fluorescent pigments onto the central portion of the adhesive layer of the tape while shielding or covering its outer edges. An illustrative arrangement for carrying out this method is shown in Fig. 4. In this figure the tape 10 is shown being moved horizontally with its adhesive layer upmost. A hopper 20 containing luminescent pigments is positioned above the tape with its mouth located over the central portion of the tape. A pair of shielding means 21, 22 are positioned on either side of the mouth of the hopper in such a manner as to shield the outer edges of the adhesive layer of the tape from deposit of the pigment. Luminescent pigments are thus deposited on the adhesive layer between the shielding members. A brush 23 or similar means is positioned behind the hopper and serves to press the crystals of the pigment into the adhesive layer. The tape is then passed around a roller 24 so that the excess of the pigment crystals may fall from it by the action of gravity as illustrated at 25.

Applicant has disclosed a novel luminescent coating material which lends itself readily to the production of any desired luminescent indication in which the substances utilized to produce luminescence are protected by the material itself both before and during use. The material is easily and quickly applied without the untidiness accompanying the use of liquid coating materials and is available for use immediately after application. It may be removed from a surface without marring an existing finish and is readily formed to any desired design without the necessity of the employment of the skill of the sign painter.

Applicant has also disclosed a novel method of manufacturing a luminescent tape or similar luminescent coating material. This method is simple, requires little apparatus and wastes no material. A tape so made may be immediately wound into a roll for merchandising or may be immediately used.

The invention described herein may be manufactured and used by or for the Government of the United States of America for governmental purposes without the payment of any royalties thereon or therefor.

I claim:

1. A luminescent tape comprising a strip of transparent material, a coating of permanent ever tacky adhesive material substantially covering one side thereof, and a coating of luminescent material applied to said adhesive material in the form of a band narrower in width than said strip of transparent material and substantially centered with respect to the longitudinal axis thereof.

2. A self-maintaining roll of luminescent tape comprising a strip of transparent material, a coating of ever tacky adhesive material covering one side thereof and a coating of luminescent material applied to said adhesive material in the form of a band narrower in width than said strip of transparent material and substantially centered with respect to the longitudinal axis thereof, said tape being wound into a roll, the portions of said adhesive material not covered by said luminescent material serving to adhere adjacent layers of said tape to maintain said roll and to thus enclose and protect said luminescent material.

RICHARD L. TUVE.